United States Patent
Pereira

(10) Patent No.: US 7,418,715 B2
(45) Date of Patent: Aug. 26, 2008

(54) SYSTEM AND METHOD FOR PRODUCING AND COMMUNICATING REQUESTED DATA AMONG NETWORKED APPLICATION PROGRAMS

(75) Inventor: Jorge Pereira, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/102,039

(22) Filed: Apr. 8, 2005

(65) Prior Publication Data

US 2006/0230026 A1    Oct. 12, 2006

(51) Int. Cl.
*G06F 3/00* (2006.01)
(52) U.S. Cl. .................................... 719/318
(58) Field of Classification Search ............... 719/313, 719/318
See application file for complete search history.

(56) References Cited

U.S. PATENT DOCUMENTS

| | | | |
|---|---|---|---|
| 5,539,909 A * | 7/1996 | Tanaka et al. ............ 719/315 |
| 5,634,053 A | 5/1997 | Noble et al. |
| 6,023,694 A | 2/2000 | Kouchi et al. |
| 6,366,915 B1 | 4/2002 | Rubert et al. |
| 6,625,617 B2 | 9/2003 | Yarnall et al. |
| 6,985,905 B2 | 1/2006 | Prompt et al. |
| 7,113,964 B1 | 9/2006 | Bequet et al. |
| 7,207,046 B1 * | 4/2007 | Van Gerrevink ............ 719/313 |
| 7,231,433 B1 | 6/2007 | Hellbusch et al. |
| 2002/0046303 A1 * | 4/2002 | Honishi et al. ............ 709/330 |
| 2003/0014421 A1 | 1/2003 | Jung |
| 2003/0163479 A1 | 8/2003 | Mathews et al. |
| 2005/0050068 A1 | 3/2005 | Vaschillo et al. |
| 2005/0097579 A1 * | 5/2005 | Dorn et al. ............... 719/330 |

OTHER PUBLICATIONS

Tyner et al., "Web Storage System Forms: The Forms Registry," Microsoft Exchange Server 2000 Technical Articles, Mar. 2001, 11 pages, U.S.A.

* cited by examiner

Primary Examiner—William Thomson
Assistant Examiner—Lechi Truong
(74) Attorney, Agent, or Firm—Senniger Powers LLP

(57) ABSTRACT

Delivering document fragments from a web server to a server-deployed client application. The invention includes a data structure of a request for data including a namespace field, an event handler field, and a parameter field. A first process sends a populated data structure to a second process. The second process executes logic maintained by the second process and identified in the populated data structure to generate result data. The second process sends the result data to the first process for display to a user or other processing by the first process.

19 Claims, 5 Drawing Sheets

SYSTEM AND METHOD FOR PRODUCING AND COMMUNICATING REQUESTED DATA AMONG NETWORKED APPLICATION PROGRAMS

TECHNICAL FIELD

Embodiments of the present invention relate to the field of computer communications. In particular, embodiments of this invention relate to requests for data in the form of a schema having a namespace, events within the namespace, and parameters for the events.

BACKGROUND OF THE INVENTION

Some server-deployed, web-based mail applications give users access to their centrally located mailboxes. These applications also provide the ability to send and receive electronic mail (email), schedule appointments, and perform other personal information management (PIM) tasks from a network such as the Internet. Some of these applications execute in a browser and are a companion to other PIM applications. Such client web applications require a great amount of client-server traffic to be able to implement the PIM functionality. For example, when a user refreshes a list of email in an inbox to check for new email, a web request is sent to the server to retrieve the new list of email in the inbox.

For some client applications, the client-server traffic is a mix of Web Distributed Authoring and Versioning (WebDAV) extensions to the hypertext transfer protocol (HTTP) and other various schemas (e.g., based on simplistic name-value pairs in HTTP POST requests). The use of multiple protocols for data access in these prior systems complicates the implementation and contributes to poor maintainability. These prior systems also use inconsistent and insufficient schema for the requests. The name-value format such as used in some prior systems is very limited and does not easily support strongly typed data or more complex structures or arrays. In addition, because the name-value format requires a line break as the separator for name-value pairs, all data for a particular name-value pair has to be encoded without a line break before transmission and then decoded upon receipt. These extra steps in some existing systems slow the processing and increase complexity. Yet another problem with some existing web client applications is that the server-side code providing various functionality to the client application is chaotic and disorganized. Adding new request handlers to the server-side code of the existing systems is difficult.

Accordingly, an improved system for client-server communication is desired to address one or more of these and other disadvantages.

SUMMARY OF THE INVENTION

Embodiments of the invention include a protocol and schema for producing and communicating requested data among networked application programs. In an embodiment, the invention further includes an architecture and a set of application programming interfaces (APIs) available to developers of request handlers that produce the requested data. The APIs enable the developers to create custom request handlers.

In a client-server embodiment of the invention, a client according to the invention sends data requests to a server according to a well-defined schema of the invention. The request identifies a request handler namespace, an event handler within the request handler namespace, and one or more parameters of the event handler. The invention includes an infrastructure of event handlers grouped into request handler namespaces in the server that delivers responses to the client in multiple formats as requested by each client. The server infrastructure parses the request to identify a particular event handler in a particular namespace and execute handler code associated with the identified event handler as a function of the request parameters.

The invention is powerful but lightweight and scalable. The use of a consistent schema for data requests simplifies interaction between the application programs and contributes to improved maintainability of the request handlers. The schema of the invention supports complex data structures. The invention supports the addition of request handlers without changes to the infrastructure for producing and delivering the requested data.

In accordance with one aspect of the invention, a system includes one or more computer-readable media for storing a plurality of event handlers each having a namespace associated therewith. Each of the plurality of event handlers further has one or more parameters associated therewith. The computer-readable media store a data structure that represents a formatted request for data. The data structure includes a namespace field storing a namespace value representing the namespace, an event handler field storing an event handler value corresponding to one of the plurality of event handlers. The one of the plurality of event handlers is associated with the namespace represented by the namespace value in the namespace field. The data structure also includes a parameter field storing a parameter value corresponding to one of the parameters. The one of the parameters is associated with the event handler represented by the event handler value in the event handler field. The system also includes a first process deployed by a second process. The first process is configured to execute computer-executable instructions for receiving a request for data from a user or process, identifying a namespace value associated with the received request, selecting an event handler value as a function of the received request and the identified namespace value, and determining a parameter value as a function of the received request and the selected event handler value. The first process further populates the data structure by storing the identified namespace value in the namespace field, the selected event handler value in the event handler field, and the determined parameter value in the parameter field. The first process further transmits the populated data structure to the second process. A second process is configured to execute computer-executable instructions for receiving the populated data structure from the first process; selecting, as a function of the received data structure, an event handler from the plurality of event handlers stored on the computer-readable media; executing the selected event handler to generate result data; and transmitting the generated result data to the first process.

In accordance with another aspect of the invention, a computer-implemented method produces and delivers data from one process to another process. The computer-implemented method includes receiving, by a first process, a request for data from a user and identifying a namespace associated with the received request. The method also includes determining, by the first process, an event handler associated with the identified namespace as a function of the received request. The method further includes populating, by the first process, a parameter associated with the determined event handler as a function of the received request and creating a formatted request with the identified namespace, the determined event handler, and the populated parameter. The method also includes transmitting, from the first process, the created, formatted request to a second process. The method also includes receiving, by the second process, the formatted request from the first process and selecting, as a function of the received, formatted request, an event handler from a plurality of event handlers stored in a memory area. The computer-implemented method also includes executing, by the second process, the selected event handler to generate result data and transmitting the generated result data from the second process to the first process.

In accordance with yet another aspect of the invention, one or more computer-readable media have computer-executable components for producing and communicating requested data in a networked environment. The components include a server-deployed client component for receiving a request for data from a user; identifying a namespace associated with the received request; determining an event handler associated with the identified namespace as a function of the received request; populating a parameter associated with the determined event handler as a function of the received request; creating a formatted request with the identified namespace, the determined event handler, and the populated parameter; and transmitting the created, formatted request to a server component. The components also include the server component for receiving the transmitted request from the server-deployed client component; selecting, as a function of the received request, an event handler from a plurality of event handlers stored in a memory area; executing the selected event handler to generate result data; and transmitting the generated result data to the server-deployed client component.

Alternatively, the invention may comprise various other methods and apparatuses.

Other features will be in part apparent and in part pointed out hereinafter.

Figure 1:
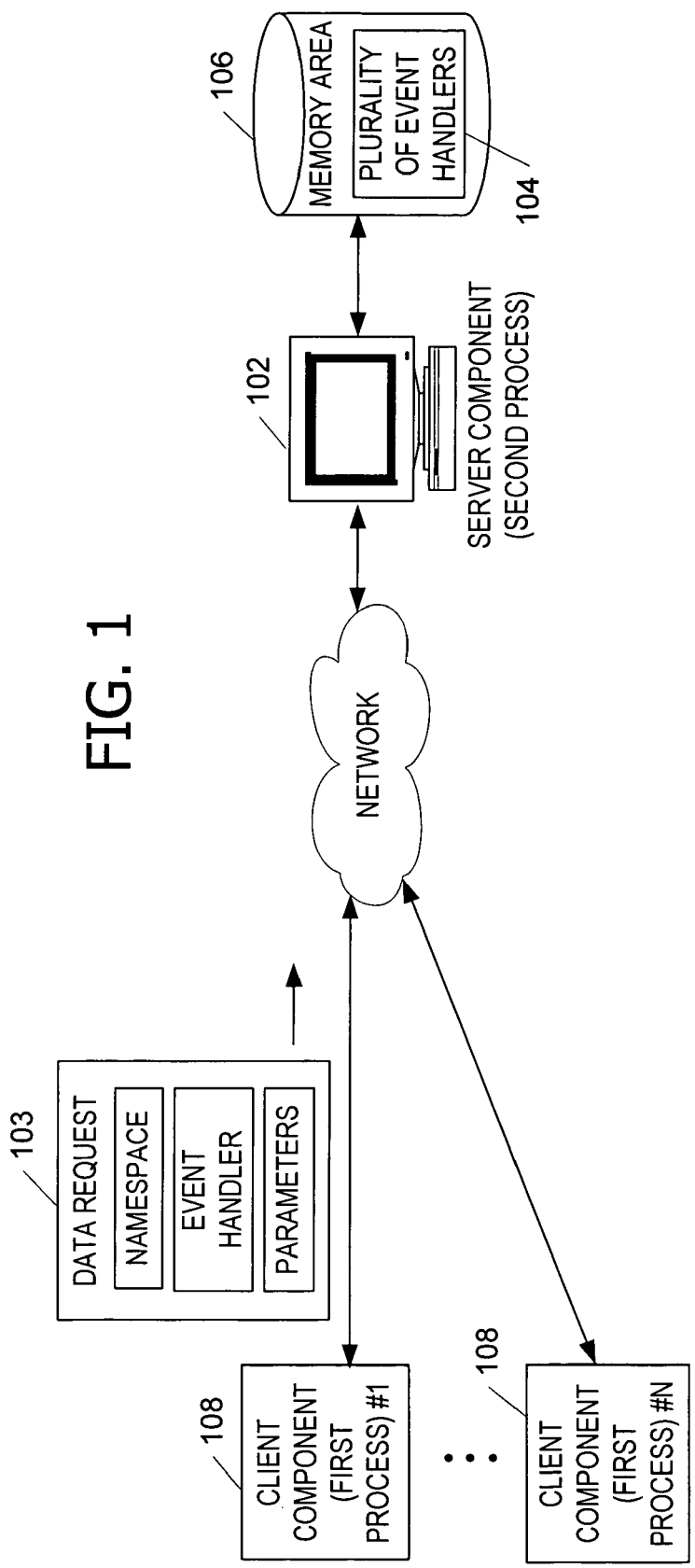
FIG. 1 is an exemplary block diagram illustrating a server component communicating with one or more client components via a network.

Appendix A describes exemplary events and parameters in an electronic mail namespace of the invention.

Corresponding reference characters indicate corresponding parts throughout the drawings.

DETAILED DESCRIPTION OF THE INVENTION

In an embodiment, the invention includes a server application, component, process, or the like delivering data to a server-deployed client application, component, process, or the like in response to a request from the client application for the data, such as illustrated in FIG. 1. On a server component 102, the code or routine for responding to requests for data such as data request 103 is divided into event handlers (e.g., a plurality of event handlers 104) or the like. The event handlers 104 are logically organized, in one embodiment, into namespaces. In particular, the invention includes building a request such as data request 103 that contains information about the namespace and event handler to execute, as well as the parameters to that handler. The invention further includes an infrastructure in the server 102 that allows developers to implement request handlers that deliver responses to data requests.

One example of the invention involves a calendar view in a distributed personal information management application. A calendar view shows a list of appointments for a given day. The server 102 refreshes this view in the calendar by querying a database to retrieve appointments in a given time range. The retrieved appointments are then drawn in a client (e.g., client component 108) in the right positions depending on the start time and duration of each of the appointments. In previous systems, such a refresh operation was achieved by the client component 108 querying for the data to be returned in extensible markup language (XML) format using the Web Distributed Authoring and Versioning (WebDAV) extensions to the hypertext transfer protocol (HTTP), using an extensible schema definition (XSD) transformation to generate HTML from the XML data, and presenting the HTML to the user. Such systems are complicated and difficult to maintain.

However, with the invention, a calendar refresh is achieved by the client component 108 sending a formatted request for data (e.g., data request 103), and receiving a stream of code (e.g., JavaScript) defining the calendar data. The calendar data is partially rendered in the server 102. The client component 108 executes the code and generates the HTML markup using script. The burden on the client component 108 is reduced because most of the calendar data and display information is pre-computed in the server 102. In another example of the invention, the server 102 refreshes a mail view of a PIM application by returning HTML that has been rendered in the server 102. The invention is not limited to returning data in any particular format. Rather, the invention returns data in any form dictated by the client component 108 such as HTML, XML, text, a JavaScript payload, or the like.

Referring again to FIG. 1, an exemplary block diagram illustrates a server component, process, or the like such as server component 102 communicating via a network (e.g., the Internet) with one or more client components 108, processes, or the like such as client component #1 through client component #N. The system of FIG. 1 includes one or more computer-readable media such as a memory area 106. The memory area 106 stores a plurality of event handlers 104 each having a namespace associated therewith. Each of the plurality of event handlers 104 further has one or more parameters associated therewith. A data structure representing a formatted data request 103 is also stored on a computer-readable media. In FIG. 1, the data request is shown being sent from the client component 108 to the server component 102. The data structure representing data request 103 includes a namespace field storing a namespace value representing the namespace. The data structure further includes an event handler field storing an event handler value corresponding to one of the plurality of event handlers 104 stored in the memory area 106 that is associated with the namespace represented by the namespace value in the namespace field. The data structure further includes a parameter field storing at least one parameter value corresponding to a parameter associated with the event handler represented by the event handler value in the event handler field.

In the example of FIG. 1, the client component 108 is a first process, and the server component 102 is a second process. The first process is a distributed client application or is otherwise deployed by the second process to provide some or all of the functionality of the server component 102. For example, the first process may be a server-deployed client application such as a server-deployed personal information management client and the server component 102 may be a personal information management server. However, the invention is not limited to a client-server relationship between the first process and the second process. For example, the relationship between the first process and the second process may be peer-to-peer.

In one embodiment, the first process is configured to execute computer-executable instructions for requesting data from the second process. In particular, the first process receives a request for data from a user or process. The request may include, for example, a request to check for recently received electronic mail, a request to update a calendar display, or any other request for data. The first process identifies a namespace value associated with the received request and selects an event handler value as a function of the received request and the identified namespace value. The selected event handler is particular to the specific request from the user and is one of the plurality of event handlers 104 associated with the identified namespace value. The selected event handler has one or more parameters. The first process determines a parameter value for one or more of the parameters of the selected event handler. The parameter value is determined using data from the received request. The parameter value may include data of any type and may be embodied in any format recognized by the second process (e.g., extensible markup language). The first process populates the data structure representing data request 103 by storing the identified namespace value in the namespace field, the selected event handler value in the event handler field, and the determined parameter value in the parameter field. The first process transmits the populated data structure (e.g., data request 103) to the second process.

In one embodiment, the populated data structure includes a series of name-value pairs. For example, the namespace field and the namespace value are a name-value pair, the event handler field and the event handler value are a name-value pair, and the parameter field and the parameter value are a name-value pair.

The second process is configured to execute computer-executable instructions for generating and delivering the requested data to the first process. In one embodiment, the second process receives the populated data structure (e.g., data request 103) from the first process and selects an event handler from the plurality of event handlers 104 stored in the memory area 106. The selected event handler corresponds to the event handler specified in the received data request 103. The second process executes the selected event handler using the parameters from the data request 103 received from the first process to generate result data. The second process transmits the generated result data to the first process.

In one embodiment, the second process selects the appropriate event handler by consulting a configuration database loaded with information about the available namespaces, event handlers (e.g., the plurality of event handlers 104), and parameters. The second process includes, for example, a registry component for building the configuration database prior to receiving the data request 103 from the first process. For example, the plurality of event handlers 104 may be organized in the configuration database by namespace.

The invention includes means for storing the plurality of event handlers 104, means for executing the first process, and means for executing the second process. Hardware and software such as a data structure, a user interface, an application program, an application programming interface (API), computer-executable instructions, firmware, and the like (such as illustrated in the figures) constitute means for storing the plurality of event handlers 104, means for executing the first process, and means for executing the second process.

In one embodiment, the invention is implemented using HTTP requests with the POST or GET verb. A request includes the following information: a namespace (e.g., indicated in the URL query string parameter 'ns'), an event name (e.g., indicated in the URL query string as the 'ev' parameter), and one or more request parameters. Parameters are either in XML for POST requests or as name-value pairs for GET requests.

An exemplary GET request (e.g., data request 103) of the invention is as follows.

URL: /mail/ev.owa?ns=CalendarView&ev=Refresh&d=11142004T00:00:00Z

In this example, the client (e.g., client component 108) is asking the server (e.g., server component 102) to execute the "Refresh" handler in the "CalendarView" namespace. The client component 108 passes a parameter of type date named "d" with value Nov. 14, 2004 at 12 am. The server component 102 returns the markup or JavaScript payload for this view, depending on the implementation.

An exemplary POST request (e.g., data request 103) of the invention is as follows.

```
URL: /mailserver/ev.owa?ns=Messaging&ev=SaveMessage
BODY:
  <params>
      <subject>Test email</subject>
      <to><item>userA@pageA.net</item><item>userB@pageA.net</item></to>
      <body>Test something</body>
  </params>
```

In this example, the client component 108 is asking the server component 102 to execute the 'SaveMessage' event handler in the 'Messaging' namespace. The event parameters are the subject (string), to (array of strings) and body (string). The response for this event is an HTTP result indicating success or error. In this case, no returned markup is necessary. The parameters may be in the form of XML or any other language format understandable to the server.

Figure 2:
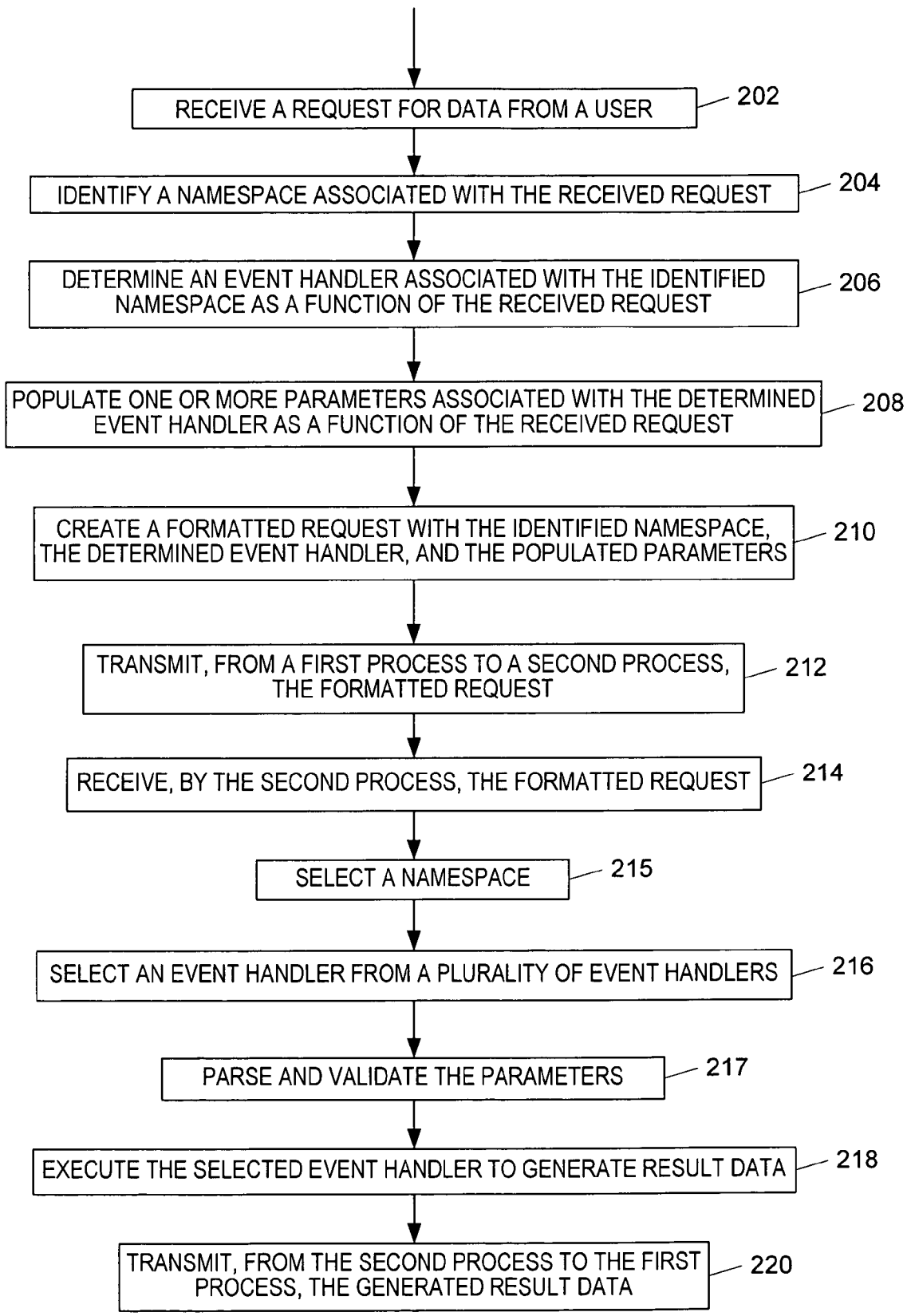
FIG. 2 is an exemplary flow chart illustrating operation of the client and server processes for communicating requested data.

Referring next to FIG. 2, an exemplary flow chart illustrates operation of the client and server processes for communicating requested data. The flow chart of FIG. 2 reflects a computer-implemented method for producing and delivering data from one process to another process. The method includes receiving, by a first process such as client component 108 in FIG. 1, a request for data from a user at 202 and identifying a namespace associated with the received request at 204. The method further includes determining an event handler associated with the identified namespace as a function of the received request at 206 and populating a parameter associated with the determined event handler as a function of the received request at 208. The method also includes creating a formatted request (e.g., data request 103 in FIG. 1) with the identified namespace, the determined event handler, and the populated parameter at 210. The method transmits, from the first process to a second process (e.g., server component 102), the created, formatted request at 212.

The method of the invention includes receiving, by the second process, the formatted request from the first process at 214. The method selects a namespace at 215 based on the received request. The method also includes selecting, by the second process as a function of the received, formatted request, an event handler from a plurality of event handlers (e.g., plurality of event handlers 104 in FIG. 1) stored on one or more computer-readable media (e.g., memory area 106 in FIG. 1) at 216. The method parses and validates the parameters in the received request at 217. The method further includes executing the selected event handler to generate result data at 218 and transmitting, from the second process to the first process, the generated result data to the first process at 220. The first process receives the result data and, in one example, displays the data to the user.

A developer or other user may create user-defined namespaces, event handler, and/or parameters. The method of the invention further includes receiving, by the first process from the user, a user-defined namespace, a user-defined event handler associated with the user-defined namespace, and/or a user-defined parameter of the user-defined event handler. The first process registers the received user-defined namespace, the user-defined event handler, and/or the user-defined parameter with the second process. The second process registers the received user-defined namespace, the user-defined event handler, and the user-defined parameter without changing an infrastructure of the second process. That is, the code implementing the second process (e.g., the server component) does not change because of the registration. The infrastructure of the second process accesses the registered, user-defined namespace, event handler, or parameter in the same manner that the second process accesses other namespaces, event handlers, and parameter values.

In one embodiment, one or more computer-readable media have computer-executable instructions for performing the computer implemented method illustrated in FIG. 2.

Figure 3:
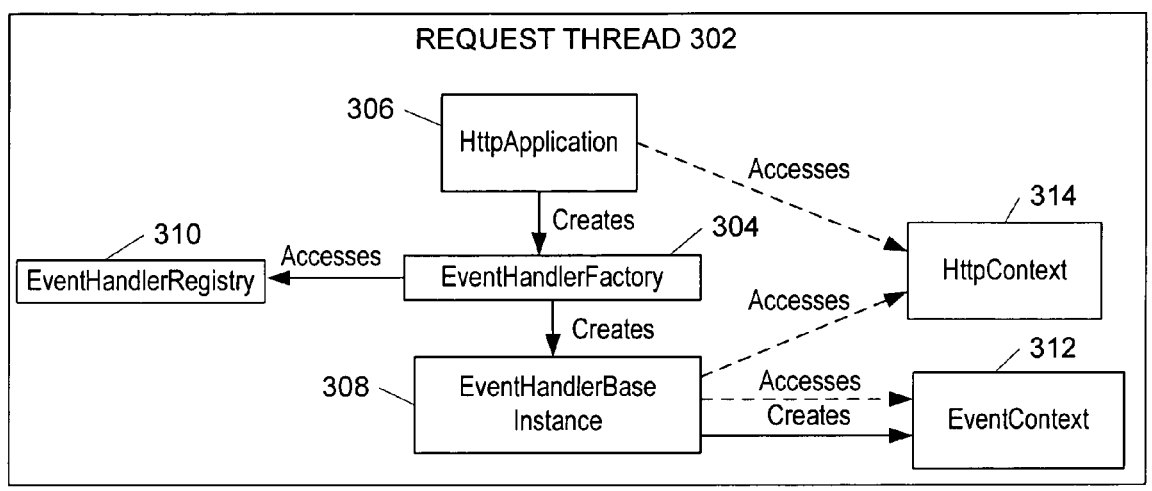
FIG. 3 is an exemplary block diagram illustrating modules in the server component.

Referring next to FIG. 3, an exemplary block diagram illustrates modules in the server component. The modules are called within a request thread 302 spawned by the server component. In one embodiment, the event handlers are HTTP handlers implementing an IHttpHandler interface. The invention calls a ProcessRequest method in this interface which allows the handler class to run the code to process the request. An HTTP handler factory is a class that implements the IHttpHandlerFactory interface. Such objects are used to create instances of the HTTP handler objects used to process the requests. In the example of FIG. 3, an HTTP handler factory class called EventHandlerFactory 304 is shown. The invention (e.g., HTTP Application 306) instantiates an object (e.g., EventHandlerBase instance 308) of this class and calls a "GetHandler" method of the IHttpHandlerFactory interface, which creates an instance of the appropriate HTTP handler class (e.g., EventHandlerBase subclasses) based on the namespace of the request. HTTP Application 306 and EventHandlerBase instance 308 access an HTTP Context 314.

An EventContext 312 object is a data structure that contains information about the request (e.g., the namespace, event names, and the parameters of the request). The EventHandlerRegistry 310 is a class that serves as a repository of information about the namespaces and their event handlers implemented by the application, as well as the custom data structures supported and enumerations. The application registers an EventHandlerBase class using this repository 310 at application start. The invention scans the class (e.g., using reflection) to determine the namespace, events within the namespace, and parameters of the events. This information is stored and used later during the processing of the request and the parsing of the parameters.

An exemplary flow of execution of a request according to the invention is illustrated in FIG. 3. The invention receives a request for data according to the invention, creates an instance of an EventHandlerFactory class, and calls GetHandler on the created instance. The EventHandlerFactory's GetHandler implementation looks at the query string to figure out the namespace and event names, and searches the EventHandlerRegistry 310 for the handler class corresponding to the namespace and event names in the query string. If the invention finds the requested event handler, the invention creates an instance of that event handler. The EventContext 312 is also created. The invention calls ProcessRequest on the event handler. ProcessRequest parses the parameters of the request using a parser class particular to the request itself (e.g., whether the request is a GET verb or a POST verb. The parses class parses the parameters in the request and uses EventHandlerRegistry 310 to do any type conversions and to ensure that the schema is correct (e.g., ensure that all the parameters required by this handler are set). The parameters may be stored in a collection in the context at this point. The invention executes the event handler code associated with the event handler (e.g., execute a method in the handler class). This code accesses the parameters in the context, performs the processing, and writes the response to the requesting entity in any format specified by the requesting entity.

Figure 4:
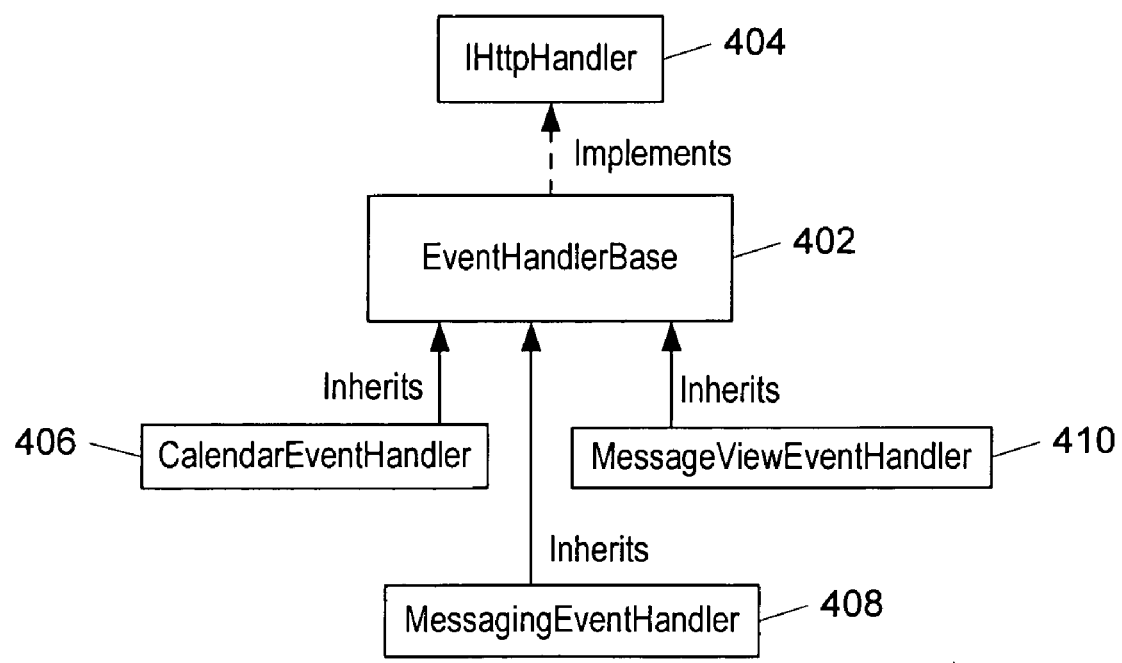
FIG. 4 is an exemplary block diagram illustrating an exemplary set of event handler classes.

Referring next to FIG. 4, an exemplary block diagram illustrates a sample set of event handler classes inheriting from EventHandlerBase 402. EventHandlerBase 402 implements an IHttpHandler interface 404. CalendarEventHandler 406, MessagingEventHandler 408, and MessageViewEventHandler 410 inherit from EventHandlerBase 402. Developers or other users may create a custom event handler such as shown in FIG. 4 by creating a namespace, identifying an event in the namespace, and defining parameters for the event. A user-defined namespace, event handler, and/or parameter may be user-selected (e.g., a new event handler within an existing namespace) or user-created (e.g., a new namespace). In one embodiment, a user-defined event handler is implemented as a dynamic link library.

Developers or other users may define a schema of the namespace using attributes such as shown below.

```
[EventNamespace("Namespace1")]
internal class TestEventHandler: EventHandlerBase
{
    [Event("Event1")]
    [EventParameter("Param1", typeof(string))]
    [EventParameter("Param2", typeof(int))]
    public void Event1( )
    {
        string param1 =
(string)Context.GetParamValue("Param1");
        int param2 = (int)Context.GetParamValue("Param2");
        Writer.Write("{0} + {1} = {2}", param1, param2, param1
+ param2).
    }
}
```

In this example, the EventNamespace attribute defines the name of the namespace over the wire, the Event attribute defines the name of the event over the wire, and the EventParameter attribute defines the name of the parameter, the type and whether the parameter is optional or not. To use the handler, the handler developer writes a class that inherits from EventHandlerBase 402, writes the events as methods that do not have any parameters and return void, defines the schema using the appropriate attributes described above, and registers the class with the server component.

Data structures of the invention allow developers to define complex types that may be used as parameters. An exemplary data structure is shown below.

```
[EventStruct("r")]
internal class RecipientWellItem
{
    [EventField("dn")]
    public string DisplayName;
    [EventField("em", true, "oof@pageA.net")] // true = optional field
    public string Email;
    [EventField("t")]
    public int Type;
    internal RecipientWellItem( )
    {
        DisplayName = " ";
        Email = " ";
        Type = 0;
    }
}
```

The exemplary data structure above is encoded as shown below.

<r dn="display name" em="email address" t="1"/>

When the server component of the invention receives a request that conforms to a specific data structure, the invention creates an instance of the specific data structure class and populates it with the data from the request.

Exemplary Operating Environment

Figure 5:
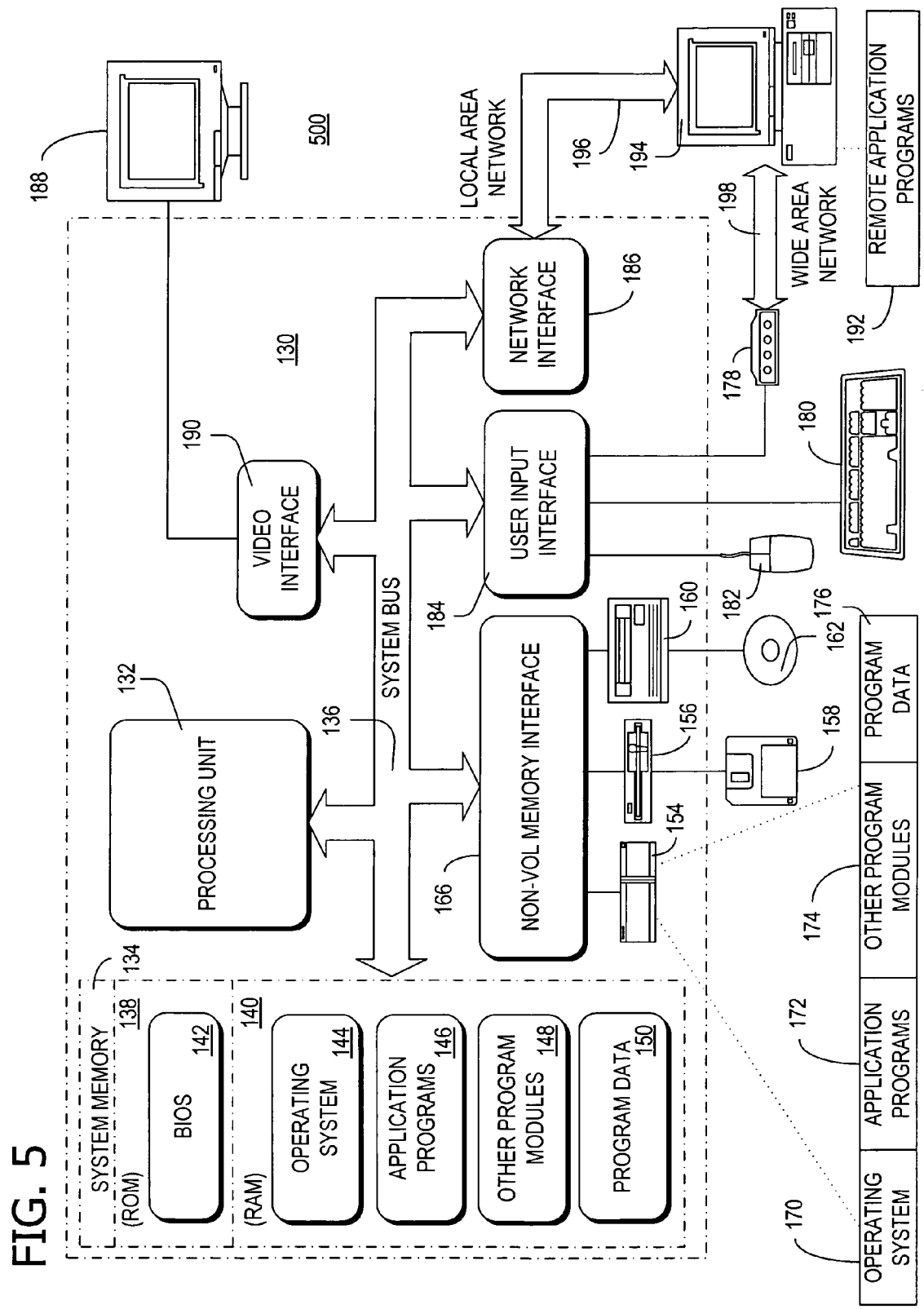
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 2 to produce and communicate requested data among networked application programs.

Appendix A lists exemplary namespaces, event handlers, and parameters according to the invention. In Appendix A, a DatePickerEventHandler handler type includes events for a date picker. A date picker is a user interface component that allows a user to select dates in several contexts in the application. The RenderMonth event renders the HTML fragment corresponding to a month. When the user clicks to navigate to January 2005, the client component of the invention sends the RenderMonth event to the server which takes the input parameters (e.g., 'm' for month which is the date January 2005) and renders the HTML fragment for that month. The rendered HTML fragment is sent back to the client.

A MessageListViewEventHandler handler type includes events for the message list view that shows messages, for example, in an inbox. The Delete event is run when the user selects a few messages for deletion. The folder identifier is represented by the attribute 'fId'. The arrays of message identifiers to delete is represented by the attribute 'id.'

A RecipientWellEventHandler is the event handler for the recipient well. An example of an event in this handler type is 'resolve. ' 'Resolve' takes the to, cc, and bcc fields in an electronic mail message as parameters which are arrays of strings. The Resolve event parses and resolves these strings. For example, if a user types "BobS", the data request is sent to the server with a single item in the array corresponding to the 'to' parameter: "BobS". The response is an HTML fragment with "Bob Smith" in HTML with Bob Smith's electronic mail address and maybe other data attached thereto.

A detailed explanation of the method GetViewPayload in the calendar view event handler is next described. The parameters for this method include the attributes 'nvs,' 'fId,' 'days,' 'vt,' and 'dir.' This event handler is called from the client when the calendar view needs to be refreshed. The calendar view displays a time strip on the left of the display with half hour increments and each day is displayed in a column.

When the calendar view needs to be refreshed, a GetView-Payload event is fired. This event loads the data from the backend (e.g., does a query in the user's calendar in the mailbox), and renders code (e.g., JavaScript) that describes that data. The rendered code is referred to as a payload. The payload is sent to the client which redraws the view using the payload data. An exemplary payload includes the start/end time of each appointment, the subject, location, free/busy status and so on. Also, the coordinates of each rectangle are calculated in the server and sent as part of this payload, to simplify the client side script.

The parameters for the GetViewPayload method include the attributes 'nvs,' 'fId,' 'days,' 'vt,' and 'dir.' The 'nvs' attribute is the "no view state" attribute which, if true, indicates that there is no need to persist the view state. The view state is a set of parameters that defines the view (e.g., the number of days viewed and the view type). The view type may be weekly or daily. If the 'nvs' parameter is false, the view state is preserved for the next time the user logs on. The 'fId' attributes is the "folder identifier" attribute which corresponds to the identifier of the calendar folder to view The 'days' attribute includes arrays of dates to view. The 'vt' attribute corresponds to the "view type" of daily or weekly. The 'dir' attribute is the optionally specified "direction" of navigation arrows. Setting this attribute means that the user clicked the navigation arrows and the server should calculate the next set of dates to view based on the 'days' attribute. For example, if the 'days' attribute is 2nd, 3rd, and 4th of March and the 'dir' attribute is set to +1, the server will add 7 days to each of these (e.g., the multi-day views advanced in 7 day increments). If the 'days' attribute is March 2 only (e.g., a single day view), clicking on the right arrow navigates to the March 3, so the server only adds 1 day.

An exemplary request to the GetViewPayload method is shown below.

```
POST /mailclient/ev.owa?oeh=1&ns=CalendarView&ev=GetViewPayload
HTTP/1.1
Body:
<params><fId>LgAAAABjczgvWhhRQKW7OM2Ok4GDAQD4If+
Jk6V9Saz9+rfNa9e8AAAAABe
dAAAB</fId><days><item>2004-12-15T00:00:00</item><item>2004-12-
16T00:00:
00</item><item>2004-12-
17T00:00:00</item></days><vt>1</vt><nvs>1</nvs></
params>
```

A portion of an exemplary response to the above request is shown below.

```
a_cERow=1;a_sFTt1="Calendar: December 2004";a_iNRP=1;
a_rgCal=new
Array(nc("RgAAAABjctheWhhRQKW7OM2Ok4GDBwD4If+
Jk6V9Saz9+rfNa
9e8AAAAABedAAD4If+Jk6V9Saz9+rfNa9e8AAAAADTfAAAI",
"12-15-2004
17:30:00 U","12-15-200418:00:00 U","Strategy Meeting","Conf Room
1",2,1,"Bob
Smith",0,1,0,0," "),nc("CAjGsFAnk8AARgAAAABjczgthehRQKW7
OM2Ok4G
DBwD4If+Jk6V9Saz9+rfNa9e8AAAAABedAAD4If+Jk6V9Saz9+
rfNa9e8AAA
AACNqAAAJ","12-15-2004 21:00:00 U","12-15-2004 21:30:00 U",
"Out of
Office"," ",2,0," ",1,3,1,0," "),nc("RgAAAABjczgvWhhRQKW7OM2O
k4GDBwD
4If+Jk6V9Saz9+rfNa9e8AAAAABedAAD4If+Jk6V9Saz9+
rfNa9e8AAAAADT
hAAAI","12-16-2004 00:00:00 U","12-16-2004 01:00:00 U","Portfolio
Development Meeting","Conf Room 2",2,1,"Joe A.",1,1,0,0," "));
a_rgDay=new
Array( );var
t;t=newCalDay("15","Wednesday",15,12,2004);av(t,0,19,1,1,0);
av(t,0,24,0.5,4,1);
av(t,0.5,26,0.5,1,2);av(t,0,32,1,2,3);av(t,0,34,1,2,4);a_rgDay[0]=t;
t=newCalDay("
16","Thursday",16,12,2004);av(t,0,20,1,1,5);av(t,0,21,1,2,6);
av(t,0,23,1,2,7);av(t,
0,25,1,1,8);av(t,0,28,0.5,6,10);av(t,0.5,28,0.5,4,9);av(t,0.5,33,0.5,3,11);
a_rgDay[1
]=t;t=newCalDay("17","Friday",17,12,2004);av(t,0,20,0.5,4,13);
av(t,0.5,20,0.5,2,
12);av(t,0.5,23,0.5,3,14);av(t,0,25,0.5,1,15);av(t,0,28,0.5,2,17);
av(t,0.5,29,0.5,3,1
8);avf(t,26,22,3);a_rgDay[2]=t;a_rgEvt=
new Array(ne(2,0,1,16,2,0))
```

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary events and parameters in the electronic mail namespace (e.g., Mail.Clients) for a server-deployed electronic mail application program are shown in the tables below.

TABLE A1

Exemplary Event Handlers and Parameters for the Date Picker Event Handler.

| | |
|---|---|
| Handler type | 'Mail.Clients.DatePickerEventHandler' |
| Event handler name | 'RenderMonth'. Verb: 'Get' |
| Parameter name | 'uF', type: 'System.Int32', isArray: 'False', isOptional: 'False', isStruct: 'False' |
| Parameter name | 'm', type: 'System.DateTime', isArray: 'False', isOptional: 'False', isStruct: 'False' |
| Event handler name | 'GetFreeBusy'. Verb: 'Get' |
| Parameter name | 'Month', type: 'System.DateTime', isArray: 'False', isOptional: 'False', isStruct: 'False' |

TABLE A2

Exemplary Event Handlers and Parameters for the Message List View Event Handler.

| | |
|---|---|
| Handler type | 'Mail.Clients.MessageListViewEventHandler' |
| Event handler name | 'Delete'. Verb: 'Post' |
| Parameter name | 'fId', type: 'Mail.Objects.IUniqueItemId', isArray: 'False', isOptional: 'False', isStruct: 'False' |
| Parameter name | 'id', type: 'Mail.Objects.IUniqueItemId', isArray: 'True', isOptional: 'False', isStruct: 'False' |
| Event handler name | 'PermanentDelete'. Verb: 'Post' |
| Parameter name | 'id', type: 'Mail.Objects.IUniqueItemId', isArray: 'True', isOptional: 'False', isStruct: 'False' |
| Event handler name | 'MarkAsRead'. Verb: 'Post' |
| Parameter name | 'id', type: 'Mail.Objects.IUniqueItemId', isArray: 'True', isOptional: 'False', isStruct: 'False' |
| Event handler name | 'MarkAsUnread'. Verb: 'Post' |
| Parameter name | 'id', type: 'Mail.Objects.IUniqueItemId', isArray: 'True', isOptional: 'False', isStruct: 'False' |
| Event handler name | 'PersistWidth'. Verb: 'Post' |
| Parameter name | 'fId', type: 'Mail.Objects.IUniqueItemId', isArray: 'False', isOptional: 'False', isStruct: 'False' |
| Parameter name | 'w', type: 'System.Int32', isArray: 'False', isOptional: 'False', isStruct: 'False' |
| Event handler name | 'PersistHeight'. Verb: 'Post' |
| Parameter name | 'fId', type: 'Mail.Objects.IUniqueItemId', isArray: 'False', isOptional: 'False', isStruct: 'False' |
| Parameter name | 'h', type: 'System.Int32', isArray: 'False', isOptional: 'False', isStruct: 'False' |
| Event handler name | 'PersistReadingPane'. Verb: 'Post' |
| Parameter name | 's', type: 'Mail.Clients.Common.ReadingPanePosition', isArray: 'False', isOptional: 'False', isStruct: 'False' |
| Parameter name | 'fId', type: 'Mail.Objects.IUniqueItemId', isArray: 'False', isOptional: 'False', isStruct: 'False' |
| Event handler name | 'Refresh'. Verb: 'Get' |
| Parameter name | 'sId', type: 'Mail.Objects.IUniqueItemId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'mL', type: 'System.Boolean', isArray: 'False', isOptional: 'False', isStruct: 'False' |
| Parameter name | 'sR', type: 'System.Int32', isArray: 'False', isOptional: 'False', isStruct: 'False' |
| Event handler name | 'SeekNextItem'. Verb: 'Get' |
| Parameter name | 'sR', type: 'System.Int32', isArray: 'False', isOptional: 'False', isStruct: 'False' |
| Parameter name | 'mL', type: 'System.Boolean', isArray: 'False', isOptional: 'False', isStruct: 'False' |
| Parameter name | 'sId', type: 'Mail.Objects.IUniqueItemId', isArray: 'False', isOptional: 'False', isStruct: 'False' |
| Parameter name | 'mId', type: 'Mail.Objects.IUniqueItemId', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Event handler name | 'SeekPreviousItem'. Verb: 'Get' |
| Parameter name | 'mL', type: 'System.Boolean', isArray: 'False', isOptional: 'False', isStruct: 'False' |
| Parameter name | 'sId', type: 'Mail.Objects.IUniqueItemId', isArray: 'False', isOptional: 'False', isStruct: 'False' |
| Parameter name | 'mId', type: 'Mail.Objects.IUniqueItemId', isArray: 'False', isOptional: 'False', isStruct: 'False' |
| Parameter name | 'sR', type: 'System.Int32', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Event handler name | 'ToggleMultiVsSingleLine'. Verb: 'Get' |
| Parameter name | 'sId', type: 'Mail.Objects.IUniqueItemId', isArray: 'False', isOptional: 'False', isStruct: 'False' |
| Parameter name | 'mL', type: 'System.Boolean', isArray: 'False', isOptional: 'False', isStruct: 'False' |
| Parameter name | 'sR', type: 'System.Int32', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Event handler name | 'FirstPage'. Verb: 'Get' |
| Parameter name | 'sId', type: 'Mail.Objects.IUniqueItemId', isArray: 'False', isOptional: 'False', isStruct: 'False' |
| Parameter name | 'sR', type: 'System.Int32', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Parameter name | 'mL', type: 'System.Boolean', isArray: 'False', isOptional: 'True', isStruct: 'False' |
| Event handler name | 'PreviousPage'. Verb: 'Get' |
| Parameter name | 'sR', type: 'System.Int32', isArray: 'False', isOptional: 'False', isStruct: 'False' |
| Parameter name | 'sId', type: 'Mail.Objects.IUniqueItemId', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Parameter name | 'mL', type: 'System.Boolean', isArray: 'False', isOptional: 'False', isStruct: 'False' |
| Event handler name | 'NextPage'. Verb: 'Get' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Parameter name | 'mL', type: 'System.Boolean', isArray: 'False', isOptional: 'False', isStruct: 'False' |

TABLE A2-continued

Exemplary Event Handlers and Parameters for the Message List View Event Handler.

| | |
|---|---|
| Parameter name | 'sId', type: 'Mail.Objects.IUniqueItemId', isArray: 'False', isOptional: 'False', isStruct: 'False' |
| Parameter name | 'sR', type: 'System.Int32', isArray: 'False', isOptional: 'False', isStruct: 'False' |
| Event handler name | 'LastPage'. Verb: 'Get' |
| Parameter name | 'sId', type: 'Mail.Objects.IUniqueItemId', isArray: 'False', isOptional: 'False', isStruct: 'False' |
| Parameter name | 'mL', type: 'System.Boolean', isArray: 'False', isOptional: 'False', isStruct: 'False' |
| Parameter name | 'tC', type: 'System.Int32', isArray: 'False', isOptional: 'False', isStruct: 'False' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Event handler name | 'Sort'. Verb: 'Get' |
| Parameter name | 'sC', type: 'Mail.Clients.Controls.ColumnId', isArray: 'False', isOptional: 'False', isStruct: 'False' |
| Parameter name | 'sO', type: 'Mail.Objects.SortOrder', isArray: 'False', isOptional: 'False', isStruct: 'False' |
| Parameter name | 'mL', type: 'System.Boolean', isArray: 'False', isOptional: 'False', isStruct: 'False' |
| Parameter name | 'sR', type: 'System.Int32', isArray: 'False', isOptional: 'True', isStruct: 'False' |
| Parameter name | 'sId', type: 'Mail.Objects.IUniqueItemId', isArray: 'False', isOptional: 'False', isStruct: 'False' |
| Event handler name | 'MsgToPeople'. Verb: 'Post' |
| Parameter name | 'id', type: 'Mail.Objects.IUniqueItemId', isArray: 'True', isOptional: 'False', isStruct: 'False' |
| Event handler name | 'Move'. Verb: 'Post' |
| Parameter name | 'destId', type: 'Mail.Objects.IUniqueItemId', isArray: 'False', isOptional: 'False', isStruct: 'False' |
| Parameter name | 'id', type: 'Mail.Objects.IUniqueItemId', isArray: 'True', isOptional: 'False', isStruct: 'False' |
| Event handler name | 'Copy'. Verb: 'Post' |
| Parameter name | 'destId', type: 'Mail.Objects.IUniqueItemId', isArray: 'False', isOptional: 'False', isStruct: 'False' |
| Parameter name | 'id', type: 'Mail.Objects.IUniqueItemId', isArray: 'True', isOptional: 'False', isStruct: 'False' |

TABLE A3

Exemplary Event Handlers and Parameters for the Recipient Well Event Handler.

| | |
|---|---|
| Handler type | 'Mail.Clients.RecipientWellEventHandler' |
| Event handler name | 'Resolve'. Verb: 'Post' |
| Parameter name | 'Bcc', type: 'System.String', isArray: 'True', isOptional: 'True', isStruct: 'False' |
| Parameter name | 'Cc', type: 'System.String', isArray: 'True', isOptional: 'True', isStruct: 'False' |
| Parameter name | 'To', type: 'System.String', isArray: 'True', isOptional: 'True', isStruct: 'False' |
| Parameter name | 'Recips', type: 'Mail.Clients.Common.RecipientInfoAC', isArray: 'True', isOptional: 'True', isStruct: 'True' |
| Event handler name | 'ResolveOneRecipient'. Verb: 'Post' |
| Parameter name | 'n', type: 'System.String', isArray: 'False', isOptional: 'False', isStruct: 'False' |
| Event handler name | 'GetRecipProps'. Verb: 'Post' |
| Parameter name | 'id', type: 'System.String', isArray: 'False', isOptional: 'False', isStruct: 'False' |

TABLE A3-continued

Exemplary Event Handlers and Parameters for the Recipient Well Event Handler.

| | |
|---|---|
| Parameter name | 'rs', type: 'Mail.Clients.Common.RecipientSource', isArray: 'False', isOptional: 'False', isStruct: 'False' |
| Event handler name | 'GetCache'. Verb: 'Get' |
| Event handler name | 'DeleteFromCache'. Verb: 'Post' |
| Parameter name | 'Em', type: 'System.String', isArray: 'False', isOptional: 'False', isStruct: 'False' |

TABLE A4

Exemplary Event Handlers and Parameters for the Calendar View Event Handler.

| | |
|---|---|
| Handler type | 'Mail.Clients.CalendarViewEventHandler' |
| Event handler name | 'PersistWidth'. Verb: 'Post' |
| Parameter name | 'w', type: 'System.Int32', isArray: 'False', isOptional: 'False', isStruct: 'False' |
| Parameter name | 'fId', type: 'Mail.Objects.IUniqueItemId', isArray: 'False', isOptional: 'False', isStruct: 'False' |
| Event handler name | 'PersistHeight'. Verb: 'Post' |
| Parameter name | 'fId', type: 'Mail.Objects.IUniqueItemId', isArray: 'False', isOptional: 'False', isStruct: 'False' |
| Parameter name | 'h', type: 'System.Int32', isArray: 'False', isOptional: 'False', isStruct: 'False' |
| Event handler name | 'PersistReadingPane'. Verb: 'Post' |
| Parameter name | 'isMD', type: 'System.Boolean', isArray: 'False', isOptional: 'False', isStruct: 'False' |
| Parameter name | 's', type: 'Mail.Clients.Common.ReadingPanePosition', isArray: 'False', isOptional: 'False', isStruct: 'False' |
| Parameter name | 'fId', type: 'Mail.Objects.IUniqueItemId', isArray: 'False', isOptional: 'False', isStruct: 'False' |
| Event handler name | 'GetViewPayload'. Verb: 'Post' |
| Parameter name | 'nvs', type: 'System.Boolean', isArray: 'False', isOptional: 'True', isStruct: 'False' |
| Parameter name | 'fId', type: 'Mail.Objects.IUniqueItemId', isArray: 'False', isOptional: 'False', isStruct: 'False' |
| Parameter name | 'days', type: 'System.DateTime', isArray: 'True', isOptional: 'True', isStruct: 'False' |
| Parameter name | 'vt', type: 'Mail.Clients.Controls.CalendarViewType', isArray: 'False', isOptional: 'False', isStruct: 'False' |
| Parameter name | 'dir', type: 'System.Int32', isArray: 'False', isOptional: 'True', isStruct: 'False' |
| Event handler name | 'Move'. Verb: 'Post' |
| Parameter name | 'et', type: 'System.DateTime', isArray: 'False', isOptional: 'False', isStruct: 'False' |
| Parameter name | 'fId', type: 'Mail.Objects.IUniqueItemId', isArray: 'False', isOptional: 'False', isStruct: 'False' |
| Parameter name | 'days', type: 'System.DateTime', isArray: 'True', isOptional: 'True', isStruct: 'False' |
| Parameter name | 'nvs', type: 'System.Boolean', isArray: 'False', isOptional: 'True', isStruct: 'False' |
| Parameter name | 'id', type: 'Mail.Objects.IUniqueItemId', isArray: 'False', isOptional: 'False', isStruct: 'False' |
| Parameter name | 'st', type: 'System.DateTime', isArray: 'False', isOptional: 'False', isStruct: 'False' |
| Parameter name | 'vt', type: 'Mail.Clients.Controls.CalendarViewType', isArray: 'False', isOptional: 'False', isStruct: 'False' |
| Event handler name | 'Delete'. Verb: 'Post' |
| Parameter name | 'nvs', type: 'System.Boolean', isArray: 'False', isOptional: 'True', isStruct: 'False' |

TABLE A4-continued

Exemplary Event Handlers and Parameters for the Calendar View Event Handler.

| Parameter name | 'vt', type: 'Mail.Clients.Controls.CalendarViewType', isArray: 'False', isOptional: 'False', isStruct: 'False' |
| --- | --- |
| Parameter name | 'id', type: 'Mail.Objects.IUniqueItemId', isArray: 'False', isOptional: 'False', isStruct: 'False' |
| Parameter name | 'fId', type: 'Mail.Objects.IUniqueItemId', isArray: 'False', isOptional: 'False', isStruct: 'False' |
| Parameter name | 'days', type: 'System.DateTime', isArray: 'True', isOptional: 'True', isStruct: 'False' |

What is claimed is:

1. A system for communication comprising:

one or more computer storage media for storing:

a plurality of event handlers each having a namespace associated therewith, each of said plurality of event handlers further having one or more parameters associated therewith; and a data structure representing a formatted request for data, said data structure including a namespace field storing a namespace value representing the namespace, an event handler field storing an event handler value corresponding to one of the plurality of event handlers, said one of the plurality of event handlers being associated with the namespace represented by the namespace value in the namespace field, and a parameter field storing a parameter value corresponding to one of the parameters, said one of the parameters being associated with the event handler represented by the event handler value in the event handler field; and a first process deployed by a second process, said first process being configured to execute computer-executable instructions for:

receiving a request for data from a user or process;

identifying a namespace value associated with the received request;

selecting an event handler value as a function of the received request and the identified namespace value;

determining a parameter value as a function of the received request and the selected event handler value;

populating the data structure by storing the identified namespace value in the namespace field, the selected event handler value in the event handler field, and the determined parameter value in the parameter field, wherein the populating comprises storing the namespace field and the namespace value as a name-value pair, the event handler field and the event handler value as a name-value pair, and the parameter field and the parameter value as a name-value pair; and transmitting the populated data structure to the second process; and the second process being configured to execute computer-executable instructions for:

receiving the populated data structure from the first process;

selecting, as a function of the received data structure, an event handler from the plurality of event handlers stored on the computer-readable storage media;

executing the selected event handler to generate result data, wherein the second process renders a portion of the requested data, said generated result data representing the remaining portion of the requested data yet to be processed; and transmitting the generated result data to the first process, wherein the first process executes the generated result data such that the second process partially renders the requested data and the first process renders the remaining portion of the requested data.

2. The system of claim 1, wherein the computer-readable media and the first process are associated with a server-deployed personal information management client.

3. The system of claim 1, wherein the computer-readable media and the second process are associated with a personal information management server.

4. The system of claim 1, wherein the parameter value comprises data formatted according to an extensible markup language.

5. The system of claim 1, wherein a distributed client application executes the first process and a server application executes the second process, and wherein the distributed client application provides at least a portion of the functionality of the server application.

6. The system of claim 1, wherein the second process is further configured to execute computer-executable instructions for building a configuration database with the plurality of event handlers stored on the computer-readable storage media.

7. The system of claim 1, further comprising means for storing the plurality of event handlers.

8. The system of claim 1, further comprising means for executing the first process and means for executing the second process.

9. The system of claim 1, wherein the second process is further configured to execute computer-executable instructions for:

validating the parameter value; and converting the parameter value to a data type associated therewith.

10. A computer-implemented method for producing and delivering data from one process to another process, said computer-implemented method comprising:

receiving, by a first process, a request for data from a user;

identifying, by the first process, a namespace associated with the received request, said identified namespace storing a namespace value representing the identified namespace;

determining, by the first process, an event handler associated with the identified namespace as a function of the received request, said event handler storing an event handler value corresponding to the event handler;

populating, by the first process, a parameter associated with the determined event handler as a function of the received request, said populated parameter storing a parameter value corresponding to the parameter;

creating, by the first process, a formatted request with the identified namespace, the determined event handler, and the populated parameter;

wherein the formatted request for data comprises the namespace and the namespace value as a name-value pair, the event handler and the event handler value as a name-value pair, and the parameter and the parameter value as a name-value pair;

transmitting, from the first process, the created, formatted request to a second process;

receiving, by the second process, the formatted request from the first process;

selecting, by the second process as a function of the received, formatted request, an event handler from a plurality of event handlers stored in a memory area;

executing, by the second process, the selected event handler to generate result data, said second process rendering a portion of the requested data, said generated result data representing the remaining portion of the requested data that is yet to be processed; and transmitting, from the second process, the generated result data to the first process, said generated result data including a stream of code, wherein the first process executes the generated result data such that the second process partially renders the requested data and the first process renders the remaining portion of the requested data.

11. The computer-implemented method of claim 10, further comprising receiving, by the first process, the transmitted result data.

12. The computer-implemented method of claim 10, further comprising: receiving, by the first process from the user, a user-defined namespace, a user-defined event handler associated with the user-defined namespace, and a user-defined parameter of the user-defined event handler; and registering, by the first process with the second process, the received user-defined namespace, the user-defined event handler, and the user-defined parameter.

13. The computer-implemented method of claim 12, wherein the second process registers the received user-defined namespace, the user-defined event handler, and the user-defined parameter without changing an infrastructure of the second process.

14. The computer-implemented method of claim 10, wherein one or more computer storage media have computer-executable instructions for performing the computer-implemented method of claim 10.

15. One or more computer storage media having computer-executable components for producing and communicating requested data in a networked environment, said components comprising:

a server-deployed client component for:

receiving a request for data from a user;

identifying a namespace associated with the received request, said identified namespace storing a namespace value representing the identified namespace;

determining an event handler associated with the identified namespace as a function of the received request, said event handler storing an event handler value corresponding to the event handler;

populating a parameter associated with the determined event handler as a function of the received request, said populated parameter storing a parameter value corresponding to the parameter;

creating a formatted request with the identified namespace, the determined event handler, and the populated parameter;

wherein the formatted request for data comprises the namespace and the namespace value as a name-value pair, the event handler and the event handler value as a name-value pair, and the parameter and the parameter value as a name-value pair;

transmitting the created, formatted request to a server component; and the server component for:

receiving the transmitted request from the server-deployed client component;

selecting, as a function of the received request, an event handler from a plurality of event handlers stored in a memory area;

executing the selected event handler to generate result data, wherein the server component renders a portion of the requested data, said generated result data representing the remaining portion of the requested data yet to be processed; and transmitting the generated result data to the server-deployed client component, wherein the server-deployed client component executes the generated result data such that the server component partially renders the requested data and the server-deployed client component renders the remaining portion of the requested data.

16. The computer storage media of claim 15, further comprising a registry component for building a configuration database with the plurality of event handlers stored in the memory area.

17. The computer storage media of claim 16, wherein the server component selects, as a function of the received request, an event handler from the configuration database.

18. The computer storage media of claim 15, wherein the server-deployed client component comprises a personal information management client communicating over a network with the server component.

19. The computer storage media of claim 15, wherein the server component comprises a personal information management server.

* * * * *